Patented Mar. 20, 1934

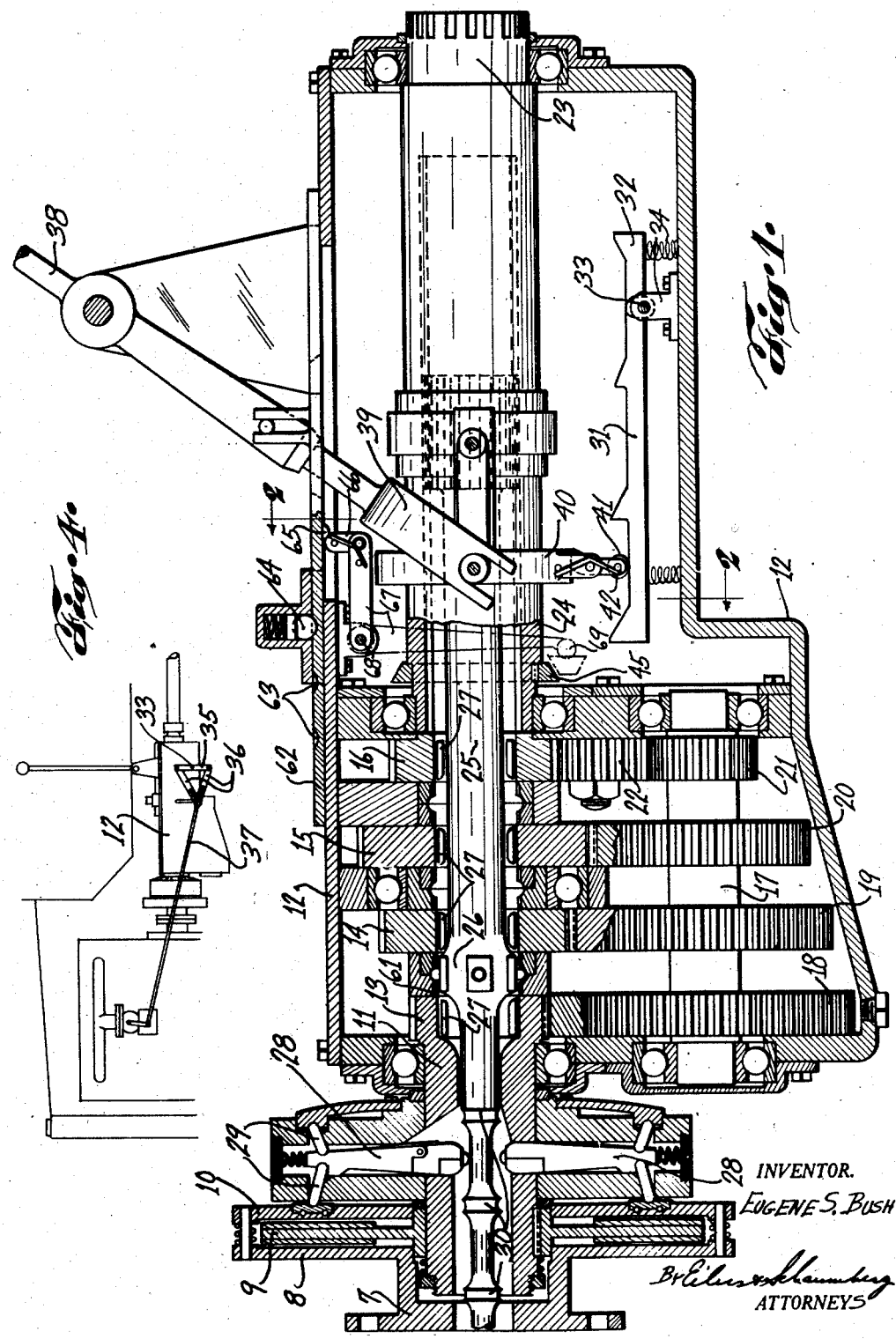

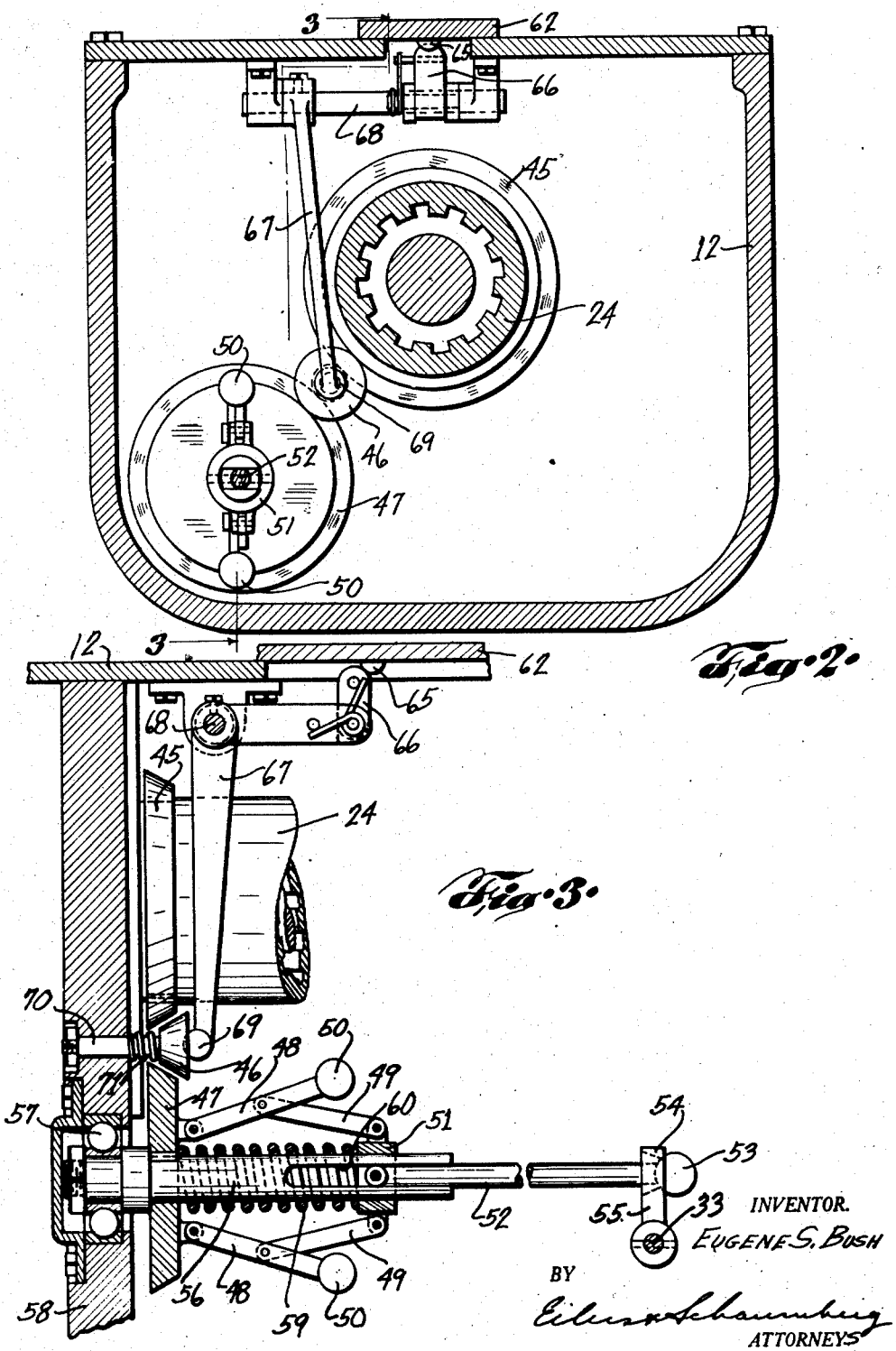

1,951,724

UNITED STATES PATENT OFFICE 1,951,724

AUTOMOTIVE TRANSMISSION EQUIPMENT

Eugene S. Bush, St. Louis, Mo., assignor to Bush Manufacturing Company, St. Louis, Mo., a corporation of Missouri Application May 5, 1932, Serial No. 609,350
Renewed February 12, 1934

12 Claims. (Cl. 192—.01)

This invention relates to improvements in automotive transmission equipment, and more particularly to improved means for synchronizing the speed of a driven automobile shaft with that of an engine, preparatory to the establishment of a driving connection therebetween.

A popular demand for a provision, in the transmission structure of an automobile, of means to permit the vehicle to overrun the engine, has resulted in a variety of expedients for controlling an engine clutch, manually or automatically, to obtain an overrunning effect.

Besides a great variety of so-called "free wheeling" devices, various power-actuated clutches have been introduced to the trade. All of such devices, as far as is known, possess a difficulty under certain operating conditions, due particularly to the fact that automotive motors of present day type exhibit a marked braking effect on the vehicle, at times when the vehicle speed exceeds, even slightly, the corresponding motor speed. This braking effect is noticeable and objectionable at times, even to the point of constituting a hazard to the driver and occupants of the vehicle when a clutch is engaged and the car is operating at a speed appreciably in excess of a corresponding or proportionate motor speed. It is to overcome the noted difficulty that the present invention is particularly directed, and thus has its general object.

An additional object consists in the provision of a simplified device which serves automatically to synchronize the speed of the engine with that of the vehicle propeller shaft, at times when the car is running ahead of the engine, and shortly in advance of engagement of the clutch.

Another object of the invention is attained in the provision of a simple structural expedient for selectively controlling motor speed, through control means operable responsively to the speed of a member having clutching connection with the engine, but at a time when such member is operatively disengaged from the engine.

Yet another object of the invention is attained in an improved device for automatically preventing objectionable engine acceleration responsively to excessive overrunning speeds of an associated vehicle.

A further additional object is attained in the provision of an engine governor constituting a selectively functional engine throttle control, responsively to the speed of an engine driven, rotatable member.

The foregoing and still further objects will appear in the course of the ensuing detailed description of a preferred embodiment of the invention, and from the drawings accompanying this specification.

In the drawings Fig. 1 is a vertical sectional elevation through a transmission and clutch assembly adapted for automotive use, and with which are incorporated exemplary embodiments of the features of the present invention; Fig. 2 is a vertical sectional elevation taken transversely of the transmission case shown in Fig. 1, and as viewed along line 2—2 thereof; Fig. 3 is a section along line 3—3 of Fig. 2, and Fig. 4 is an elevation illustrating diagrammatically a connection between the engine throttle and the speed responsive control elements, according to the present invention.

Considered in its broader aspects, the present device may be used in coordinating the speed of any engine-driven rotating member, such as a shaft, with the speed of the engine, at a time other than when the engine and driven member are operatively connected, as through a clutch. The invention is, however, described with respect to an automotive vehicle and particularly with an improved transmission and clutch assembly of a type described and claimed in my copending application of Serial No. 591,590, filed February 8, 1932. It will, however, be understood that the arrangement is equally susceptible of application to conventional automotive organizations, characterized by an engine, a propeller shaft and a friction clutch or its equivalent, through which the engine and shaft are selectively engaged and disengaged, as for the purpose of selecting desired gear ratios therebetween.

The drawings illustrate a structural organization, the details of which will more fully and at large appear in my copending application, the descriptive matter of which is incorporated herein by this reference. For purposes of present description it may be noted that a hub member 7 is positively engine driven, and a clutch including friction plates or elements such as discs 8, 9 and 10 serves selectively to connect the member 7 with a hollow driven shaft 11, extending into a transmission or gear case 12, the inner end of shaft 11 terminating in a hollow gear element 13, with which are axially aligned a plurality of gears 14, 15 and 16, assuming the structure to consist of a transmission of three speed forward and reverse type, as illustrated. A countershaft 17 is disposed parallel to the axes of gears 13, 14, 15 and 16, and serves to carry, in order, gears 18, 19, 20 and 21; an idler gear 22 between the gears 16 and 21 serving to rotate the latter two gears in relative direction appropriate for purposes of a reverse connection, as will be understood.

The arrangement illustrated is such that the paired gears of the assembly are in constant engagement, or mesh. A tail shaft or propeller shaft 23 projects externally and rearwardly of the case, as through the usual universal joints and rear axle assembly, for purposes of driving the vehicle. The shaft 23 is provided with a forward hollow portion 24 which is internally splined, as shown, and with which is always operatively associated a control shaft 25, constituting also an intermediate transmission shaft, which is provided with external splines so as to be rendered longitudinally movable with respect to the shaft 23. Shaft 25 is provided with external radial projections constituting a driving head 26 adapted selectively to be brought into driving engagement with spring pressed pawls 27, a pair or more of such pawls being disposed within an axially located hollow portion of each of the gears 13, 14, 15 and 16. The spacing between centers of these gears is such that it is impossible for the driving head 26 operatively to engage, through the pawls, more than one of the last recited gears, at a given time.

The friction clutch identified by elements 8, 9 and 10 is actuated in the example shown, by means of radial plungers 28, acting through toggle arms or levers 29, the plungers being selectively movable radially of the clutch assembly, through operative engagement by any one of a plurality of plunger-engaging clutch-actuating cams 30, there being shown one of such clutch cams for each of the several transmission gear ratios. As will be understood, when any one of the cams 30 is brought into the plane of plungers 28, the plungers will be actuated radially outwardly so as to compact clutch elements 8, 9, 10 and cause actuation of the friction clutch to engaged position. Likewise when the plungers 28 are biased by the associated springs to a retracted position with the inner ends of the plungers extending between or beyond the clutch actuating heads 30, the clutch is in disengaged position.

From the foregoing it will appear that as the control member 25, which also serves operatively to connect the selected gear with the propeller shaft 23, is moved so that the driving head 26 is engaged by the pawls 27 of a given gear, the spacing of clutch heads 30 is such that, immediately after such gear engagement, the friction clutch is actuated to engaged position and thus a coordinated clutch and transmission control is effected solely by movement of the member 25. The structural advantages of this coordinated control arrangement will more fully appear from my copending application, heretofore noted.

In addition to the coordination of gear-selection control movements, with the companion clutch-actuating control movements, the present structure includes a provision for automatically actuating the engine throttle to effect engine acceleration periods appropriate to a progressive change in gear ratios. This provision in the example shown, includes a throttle-actuating cam 31, functioning during progress of the controls through the forward speeds, and a companion throttle cam 32, serving when the controls are actuated into reverse, appropriately to position the throttle without requiring distinct thought or manipulation on the part of the operator. Cams 31 and 32 are connected to a shaft 33, projecting through bearings 34 carried by the case 12, shaft 33 serving to actuate a double-end lever 35 pivotally connected at its opposite ends through slotted levers 36 to a throttle control rod 37 (Fig. 4).

A single control lever 38, which may take the form of any desired control element, serves to actuate, endwise of the case, a yoke 39 engaging a shifting collar 40, serving to carry a pair of cam follower rollers such as 41 and 42, engaging respectively the cams 31 and 32; the roller 42 being laterally staggered with respect to roller 41 so as to engage only the cam 32 for reverse control of the throttle. The shifting collar 40 is connected by means (not shown) to the splined portion of shaft 25, the details of this connection appearing in my above mentioned copending application. The arrangement is preferably such that it is possible through movement of the lever 38, first to engage the driving head 26 with the selected gear; thereafter to cause engagement of the clutch through one of the clutch heads 30 and immediately following the clutch engagement, to effect an appropriate acceleration of the motor through the coaction, say of the roller 41 and cam 31. My preference is to provide a delayed-motion connection (not shown) between the collar 40, and the cam follower rollers 41 and 42, so that the preliminary movements of lever 38 attain a gear-engaging effect followed by clutch-engagement; thereafter, through the delayed motion connection, to move the cam follower to accelerate the motor appropriately. The structural details of this lost motion connection will appear in my copending application above referred to. The structure as thus far described constitutes, of itself, no part of the present invention, except as considered in combination with structure hereinafter described; the foregoing description being here introduced principally to show a preferred operative application of additional principles and structure developed in furtherance of the objects aforesaid.

It is well known to those who operate motor vehicles that when the vehicle has been accelerated either by motor or gravity, so that the propeller shaft rotates at a speed substantially exceeding that of the motor, a sudden engagement of the clutch causes a very distinct checking of vehicle speed due to the fact that the motor operates as a brake, tending suddenly to reduce the car speed. If the speed differential between the shaft and motor is great enough, there results, besides harmful slipping of the clutch, a high degree of physical hazard. The present provision serves automatically under such conditions, to synchronize the motor speed with the speed of the propeller shaft and thus to avoid the noted difficulty.

Considering now the structure exemplifying the present invention, there is secured to the shaft 24 a driving member or wheel 45, in the nature of a marginally beveled element which may be provided if desired with a roughened periphery, and which is disposed for engagement with a rotatable idler wheel 46, serving in turn frictionally to engage a governor drive wheel 47, the members 45 and 47 preferably being of the same diameter. The members 45, 46 and 47 may be formed of a dense, non-metallic material, such as hard fiber. The wheel 47 pivotally carries a pair of governor arms 48 which, in turn, are pivotally associated in toggle relation, with arms 49, one or both sets of the elements 48—49 being provided with governor weights or inertia elements 50. The arms 49 are pivotally secured at their outer ends to a slidable collar 51, connected to a control link 52, having a lost-motion connection through a ball end 53 and an apertured member 54 with a throttle control arm 55. It will appear from Fig. 3 that arm 55 is secured to the shaft 33, and thus is effective, responsively to oscillating movement of member 55, to actuate the engine throttle through the system of levers and links aforesaid.

The governor shaft 56 may be journalled, as in anti-friction bearings 57, in a bracket or partition 58 in the case 12. The shaft 56 serves to carry between the wheel 47 and collar 51, a suitable spring, such as a coil type compression spring 59, it being understood that wheel 47 is held against displacement along the shaft 56, while collar 51 is movable endwise along the governor shaft under the centrifugal influence of the weights. The centrifugal effect of governor weights 50 upon rotation thereof will be to compress the spring 59. In like manner this spring serves, when the governor parts are not rotating, to bias the governor weights toward an inner or retracted position. In the example shown, the governor shaft is slotted as at 60, to receive the pin through which the collar 51 is operatively connected to control rod 52.

It is my preference to actuate the governor only at such times as is necessary for the purpose of preventing undue braking effect on the car by the motor. As will have been noted from the structure of Fig. 1 and the earlier description, the spaces between the pawl-containing portions of gears 13, 14, 15 and 16 are sufficient to accommodate the driving head 26 of shaft 25. In use it has been found that, to obtain an overrunning clutch effect, a slight movement of lever 38 serves to withdraw the driving head 26 from the connecting zone within gear 13, into what may be termed the overrunning zone 61. When it is desired again to connect the motor and the propeller shaft, a very slight movement of control lever 38 is sufficient to move the driving head 26 into gear 13, and again, through one of the clutch heads 30, to cause engagement of the clutch. Since the clutch is preferably controlled only through lever 38 it is obviously desirable that synchronizing of engine and propeller shaft speeds should take place upon a predetermined placement of this lever. This result is effected, according to the present example, through a notching member 62 slidable with respect to the top of the case responsively to movement of lever 38; the notching member being provided with suitable recesses 63 engageable one at a time by a spring-pressed ball or plunger 64 which serves to notch the control in its several overrunning positions out of engagement with the gears. One of such positions corresponds to the placement of driving head 26 in the zone 61. The notching member 62 is provided on its lower or inner face with a cam or projection 65 serving depressingly to engage a hingedly mounted link 66, carried at the free end of a bell crank lever 67 mounted as by a fixed pivot 68 carried by the interior upper surface of the case 12. The relation of the members 66 and 67 is such that, as cam 65 engages member 66 in moving to the left (Fig. 1), the outer or upper end of the bell crank lever will be depressed; but further such that, as the member 66 is engaged by the cam 65 from the opposite side, or in moving to the right (Fig. 1), no actuation of lever 67 will take place. Under such conditions the hinged end member 66 is deflected laterally against the loading of a coil or leaf spring, and permitted to return to its normal position without any effect on the governor-controlled speed synchronizing arrangement.

The inner or lower end of bell crank lever 67 is provided with a ball member 69. The idler wheel 46 is preferably journalled on a stub shaft 70, carried by the bracket or wall 58 in the case, and a coil spring or its equivalent 71, disposed between the case and the wheel 46, and thus tending to oppose a movement of lever 67 in a direction to interpose, operatively, the wheel 46 in clutching or driving relation between the friction disc members 45 and 47.

It will have appeared from the foregoing description that the friction wheel 45 is rotatable with the shaft 24, and hence always at the same speed as the propeller shaft 23, but that since wheel 46 is normally kept out of driven relation with the wheel 45 through spring 71, the wheels 46 and 47 are normally at rest as are also the governor and its associated control elements.

Assuming now that the vehicle is moving, say under the influence of gravity, at such a speed that shaft 23 is revolving at the rate of 2000 R. P. M. with the driving head 26 occupying the overrunning zone 61. Under such conditions it is expected that the engine is operating at idling speed; for example 150-200 R. P. M. The operator, upon desiring again to drive the car through the propeller shaft from the motor, moves the lever 38 in a direction to bring the driving head 26 into direct-driving relation with the engine, and hence into gear 13. This is done by a very slight movement of the control lever. A continued movement of the control serves to bring one of the clutch heads 30 into actuating relation with plungers 28 and thus engage the friction clutch. However, between these two operations, it will appear from Fig. 1 that cam 65 will have operatively depressed the member 66, moving the ball end of lever 67 against the wheel 46, so as to interpose it operatively against wheels 45 and 47, against the loading of spring 71. The friction wheel 45, rotating at propeller shaft speed will operate wheel 47 at the same rate. Obviously, the governor elements 50 and 51 will be influenced centrifugally so as to cause the control member 55 to be rocked to the left (Fig. 3), a distance proportional to the speed of the propeller shaft. This will, as before noted, result in a throttle-opening movement through rod 37 in a manner to bring the engine up to propeller shaft speed. The result, apparent to the operator, consists in a smooth transition from clutch-disengaged position to clutch-engaged position, irrespective of the speed differential between motor and shaft existing prior thereto. It will appear that, when the control lever 38 is actuated in a direction to bring the driving head out of gear 13 and into the adjacent overrunning zone, the hinged end of lever 67 will be deflected and thus overridden by the cam 65. There will thus result no unnecessary engine acceleration upon shifting from direct-drive or "high" position of the controls, into overrunning placement of the parts.

My preference is so to construct the cam 65 that the engine accelerating movement attained through the governor persists until after the clutch is completely engaged, as determined by the position of control lever 38. It will appear from Fig. 1 that it is also my preference, by the selected location of the high points of cam 31, with respect to the cam 65, to avoid any overlapping or conflicting throttle control actuation, due to the several throttle control expedients.

I have described, for simplicity of illustration, the clutching actuation of the governor as effected through the slot closure or notching device 62. Obviously, since the member 40 is also movable directly with the lever 38, the actuation of lever 67 may be effected by any suitable connecting means which is movable in direct response to movements of the control lever. It will further be understood that the application of the present principle of synchronizing propeller shaft and engine speeds under certain conditions, is by no means restricted to a transmission of the present type, but is considered equally applicable to any engine, clutch and clutch-driven organization; the arrangement being such as to render it applicable to any clutch control member whether of lever or pedal-controlled type. It will further appear that a number of changes may be made in the parts described, in their combinations, and the illustrative arrangement without departing from the spirit and full intended scope of the invention as defined by the claims hereunto appended.

I claim:

1. In combination, an engine, an engine driven shaft, a clutch connecting the engine and shaft, engine-control means adapted to be actuated responsively to the speed of said shaft, said means including a disengageable driving connection operable responsively to a predetermined control placement of said clutch.

2. In a vehicle power plant, an engine, a vehicle drive shaft, a clutch between the engine and shaft, an engine governor operatively associated with said drive shaft, and means for rendering said governor operative and inoperative responsively to predetermined clutch position.

3. In an automotive power plant, an engine, a vehicle drive shaft, a clutch between said engine and shaft, and means for accelerating said engine responsively to a predetermined position of said clutch, to a degree determined by the speed of said driven shaft.

4. A control organization for an automotive vehicle, including, in combination with an engine, a vehicle drive shaft and a clutch therebetween; a clutch control member, an engine governor actuated by the drive shaft and influenced according to its speed, and means for rendering the governor operative, according to predetermined placement of said clutch control member.

5. A control organization for an automotive vehicle including in combination with an engine, a vehicle drive shaft and a clutch between said engine and shaft; a clutch control member, an engine governor actuated by the drive shaft and influenced according to its speed, means for normally keeping the governor out of operative relation with said shaft, and means for rendering the governor operative, responsively to a predetermined position of said clutch control member.

6. A control assembly for an automotive vehicle, including, in combination with an engine, a vehicle drive shaft and a clutch therebetween; a clutch control lever, an engine governor adapted to be actuated by the drive shaft, a normally inoperative connection between said shaft and the governor, and a control structure adapted for operatively relating the clutch control lever and said connection.

7. A control assembly for an automotive vehicle, including, in combination with an engine, a vehicle drive shaft and a clutch therebetween; a clutch control member, a centrifugal engine governor, a friction wheel carried by the drive shaft, a friction wheel carried by the governor, a connection between said wheels, means for normally maintaining said connection in inoperative relation to said wheels, a connection from said governor to a speed control member of the engine and means including a coacting cam and cam-follower, operatively associated with said clutch control member and adapted for establishing said governor connection according to predetermined placement of said clutch control member.

8. In an automotive power plant including an engine, a clutch and a transmission, a transmission member shiftable for speed change control purposes, a control element common to said clutch and member and adapted to coordinate the control movements thereof, speed responsive means operatively associated with a rotating element of the transmission, a connection from said speed responsive means to the engine and means for rendering said speed responsive means selectively operative and inoperative according to predetermined placement of said clutch and transmission control element.

9. In a control assembly for a motor vehicle including a friction clutch, a clutch control member, a speed change control member connected to the clutch control, a speed-responsive device in controlling relation to the vehicle motor and arranged for operation from a drive shaft of the vehicle, and a selective operative connection between said shaft and speed responsive device, said connection adapted for engagement and disengagement by manipulation of said speed change control member.

10. In an automotive power plant and control assembly, an engine, a clutch, a transmission, a vehicle drive shaft, a control lever common to the clutch and transmission and adapted for selective movement to adjacent overrunning and vehicle driving positions, an engine governor arranged to be driven from said vehicle drive shaft, and a control device for rendering said governor operative with respect to the engine responsively to movement of said control lever from overrunning position, toward vehicle driving position.

11. In an automotive transmission, in combination with an engine and driven shaft, a clutch between the engine and shaft, a control assembly including a clutch control lever, a normally inoperative, engine-throttle-positioning device, influenced responsively to the speed of said driven shaft and means for rendering said throttling device operative, responsively to predetermined movement of said clutch control lever in one direction, said means being arranged to remain inoperative, during movement of said control lever in the opposite direction.

12. In an automotive drive assembly including a transmission and friction clutch, a plurality of centrally apertured, coaxially arranged gears, a shaft arranged to be driven selectively by the gears, a driving head on said shaft movable selectively into connecting relation within the apertures of the gears and into an overrunning zone adjacent one of said gears, a clutch-actuating head on said shaft, so spaced from said driving head as to be brought into clutch-actuating position, upon movement of the driving head into the gear adjacent said overrunning zone, an engine governor operated by the driven shaft, means for normally keeping said governor out of operative connection with said shaft, and means for connecting said governor and shaft responsively to movement of said driving head from said overrunning zone and toward a position of connection with said adjacent gear.

EUGENE S. BUSH.